INVENTOR.
David B. Cox

United States Patent Office 3,443,663
Patented May 13, 1969

3,443,663
LUBRICATION SYSTEM EMPLOYING A
VISCOELASTIC LIQUID
David B. Cox, Sewell, N.J., assignor to Mobil Oil
Corporation, a corporation of New York
Filed Aug. 24, 1966, Ser. No. 574,710
Int. Cl. F01m 1/00; F16n 17/06, 29/00
U.S. Cl. 184—6                                5 Claims

ABSTRACT OF THE DISCLOSURE

A pumping device is provided for continuously flowing a lubricant over a rotatable shaft, or other structure, to be lubricated. Pumping force for the lubricant is the normal force effect provided by a parallel plate arrangement on the shaft, employing a viscoelastic liquid as the lubricant. The lubricant is connected as it leaves the shaft and is returned by gravity to the parallel plates.

---

This invention relates to an improved lubricant pumping system for flowing lubricating liquid continuously along the surfaces of a rotating structure which is to be lubricated, such as a shaft, bearing, or the like. More particularly, it relates to a system as described in which the liquid, after passage over the surfaces of the structure, is collected and returned to its starting point for reuse.

According to the invention, the structure to be lubricated, which has a rotatable shaft supported in a bearing or housing, is provided, preferably at an end portion thereof, with a parallel plate arrangement comprising a plate fixed to the shaft and rotatable therewith and, slightly spaced therefrom, a second stationary plate in the form of a surface on the bearing or housing. The rotatable plate, it may be noted, is spaced outwardly of the said surface. Both the plates and the said surface are substantially flat and substantially parallel to each other, and together define a narrow gap. A viscoelastic liquid is present in the gap during rotation of the shaft and comprises the lubricant therefor; it is characterized by exhibiting a normal force effect, as will be described. Upon rotation of the shaft, and therefore the plate, a rotational stress is applied to the liquid in the gap, and it then undergoes rotational shear; in turn, a normal force effect is generated in the liquid the direction of which is from the plate to the housing. As a result of this effect, liquid enters the clearances, which may be conventional engineering clearances, between the shaft and the bearing and makes its way along the surfaces of the shaft, thus lubricating it. When such liquid reaches the opposite end of the shaft, it is removed, collected in suitable means, and returned to the gap, preferably by gravity, for passage again along the shaft.

As may be apparent from the foregoing, the liquid used for lubrication, also supplies, with the aid of the rotating shaft, the pumping action.

Among other advantages, the invention provides a means of continuously flowing a lubricant over a structure, and as a result, a longer useful life is provided for the lubricant since it is not subjected to any local unfavorable conditions for long periods of time. The step also provides a means of exercising some control of the temperature of the lubricant. A further advantage resides in the simplicity of the operative structure, and particularly in the face, already noted, that the lubricating liquid also functions as a means of providing pumping power.

The invention may be better understood by referring to the accompanying drawings in which a selected embodiment is illustrated and in which FIG. 1 comprises a broken, central longitudinal sectional view of a bearing-supported shaft disposed in a housing;

Figure 1:
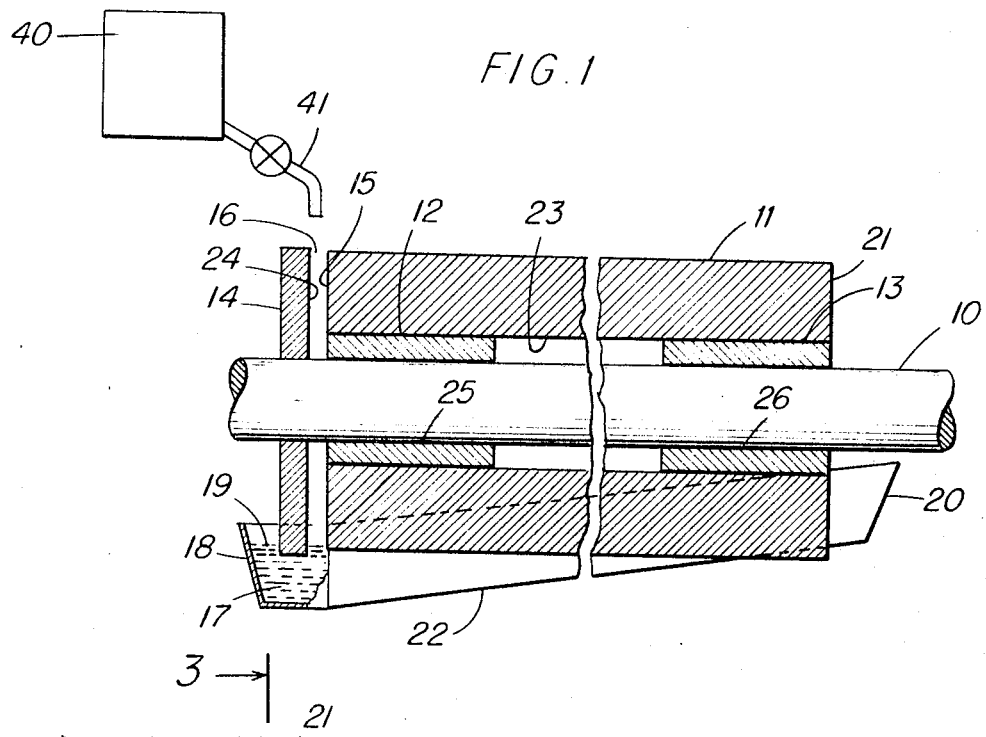

As shown in the drawings, the device comprises a rotatable shaft 10 disposed in a housing 11 which suitably comprises a pair of spaced bearings 12, 13 of bronze or other bearing material. A plate 14 is fixedly mounted on the shaft 10 by means not shown adjacent an end portion 15 of the housing, being slightly spaced therefrom by a narrow gap 16. The end portion 15 comprises a substantially flat surface and is substantially parallel to the plate 14. As shown, the parallel surfaces are substantially coextensive in size. Both plate 14 and the end face 15 are preferably circular in outline form. Gap 16 is shown exaggerated in size although actually it is quite narrow, the width of which is of the order of 0.001 inch to about 0.200 inch, which corresponds to a range of 0.025 to 5 mm. The lower limit of the gap size corresponds to conventional engineering tolerances. A more preferred gap width is in the range of 0.5 to 5 mm.

The lower portion of plate 14 extends into viscoelastic liquid 17 disposed in the reservoir 18. As shown, the plate just dips into the liquid 17, extending slightly below the liquid level 19.

Another reservoir 20 is disposed adjacent the other end face 21 of shaft 10 and is joined by the longitudinally extending reservoir or trough 22 to the reservoir 18.

In operation, the viscoelastic liquid lubricant is introduced to reservoir 18 preferably to a level just above the periphery of plate 14, as shown. It may also be added to space 23 intermediate the bearings by means not shown. As will be understood, the tolerances or clearances between the shaft and the bearings permit rotation of the shaft and passage of the lubricant. Rotation of the shaft is started, as by driving the same by suitable mens not shown, and in turn plate 14 rotates, resulting in the application of a rotational stress to the liquid in reservoir 18, and this liquid then undergoes rotational shear. Gap 16, as described, is of such narrowness and the shear rate of such magnitude that the liquid rises in the gap and fills the same. A characteristic of the liquid undergoing shear in gap 16, is that it produces a force which is normal to the opposed surfaces 15, 24 on each side of the gap. The direction of the force is toward both surfaces, i.e., it expresses itself as a force which tries to move the surfaces away from each other; however, as neither plate 14 nor the housing is axially movable, the net effect is to be found in the liquid. The normal force is present in the liquid and exerts itself along the surfacs of the shaft, the result being that the liquid in gap 16 exerts a pressure in the direction of the housing 11 and bearing 12, and this favors the flow of liquid in the clearances, designated 25, between the shaft and the bearing. In this way continuous passage of the liquid along the shaft surfaces is brought about.

The liquid flows along the shaft to the opposite end face 21 of the housing where it emerges from the clearance, designated 26, and is collected in the reservoir 20. The liquid then flows by gravity in the reservoir 22, which joins the end face reservoirs 20 and 18, back to the latter reservoir where it is again available for passage along the shaft in the manner described.

Figure 2:
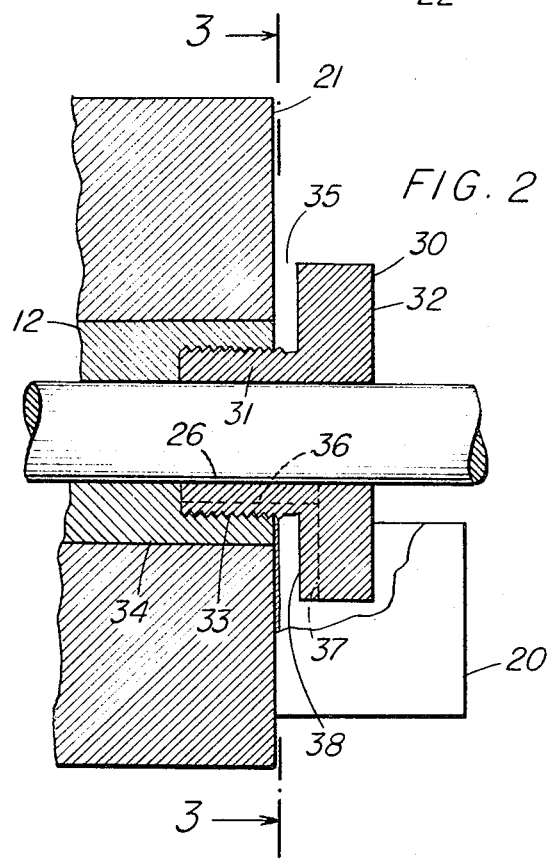
FIG. 2 is an enlarged partial view, in cross section, of a modification.
Figure 3:
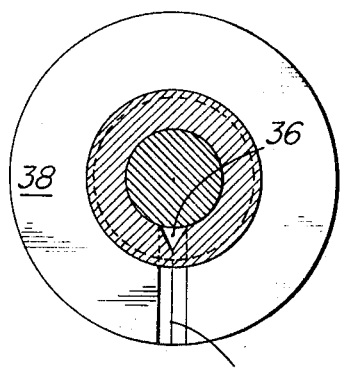
FIG. 3 is a view along the line 2—2 of FIG. 2.

To aid in securing a clean discharge of liquid from end face 21 into reservoir 20, the modification shown in FIGS. 2 and 3 may be used, comprising the use of an end piece 30 having a shank portion 31 and a flat head 32. The shank portion is suitably secured, as by threads 33, to the end portion 34 of the bearing 12. The head 32 is spaced from end face 21 as at 35 to permit liquid to flow from clearances 26 into reservoir 20. Shank 31 has an internal V-shaped groove 36 cut therein which intersects with V-shaped groove 37 cut in the underside of the head. Liquid in the clearances 26 is thus channeled by the grooves so as to flow readily into reservoir 20. In FIG. 3, it will be understood that the wide mouth of the V-shaped groove 37 is disposed toward the observer.

When the plate is at rest, liquid of course will flow out of the gap 16 into the reservoir 18. If desired, to help fill the gap at start up, a supply tank 40 with valved spout 41 may be operatively disposed relatively to the gap, as shown in FIG. 1. Liquid from the tank may be flowed into the gap as the shaft begins to rotate, and excess liquid is caught in the reservoir. When a minimum speed is reached, the liquid remains in the gap.

Generally speaking, the viscoelastic liquid, as the term implies, refers to a liquid which exhibits both viscous and elastic behavior; thus, it has flow properties of a liquid and elastic properties of a solid. Besides being viscoelastic, the liquid is one which exhibits the normal force phenomenon, namely, during application of rotary stress, it undergoes rotary shear and produces a force normal to the described opposed plate surfaces. The liquid is of course a viscous one, as required for a strong normal force effect.

An example of a suitable viscoelastic liquid is a 5% by weight solution in mineral oil by polyisobutylene of a viscosity average molecular weight of $1.23 \times 10^6$. The mineral oil has a kinematic viscosity of 108 centistokes at 100° F. and 9.5 centistokes at 210° F., and a molecluar weight of 462. This solution exhibits an apparent viscosity ranging from 1,000 down to about 20 poises at 77° F. and shear rates in the range of 1 to 10,000 reciprocal seconds, and an apparent viscosity ranging from 100 down to 4 poises at 167° F. and shear rates in the range of 1 to 10,000 reciprocal seconds. Plots of apparent viscosity versus shear rate at these various temperatures show curves of sigmoid shape, indicating that the liquid is a pseudoplastic type of non-Newtonian material. At shear rates ranging from about 10 to 1,000 reciprocal seconds, and at temperatures of 77 to 167° F., the liquid exhibits a normal force or normal pressure, expressed as pounds of total thrust, ranging from about 0.2 to about 6.4 lbs. when tested in a modified Ferranti-Shirley cone-plates rheogoniometer having a cone type shearing element of a radius of only 1.58 inches, a cone angle of 21″, and a maximum speed of only about 30 r.p.m. At any fixed temperature, this relationship between normal force and shear rate is a linear one for this liquid. On scale up, the foregoing value of 6.4 lbs of thrust (measured at 77° F., 30 r.p.m. and 500 reciprocal seconds) would reach a maximum of 64 lbs. on increasing the radius of the shearing element to 5 inches, and if the rotary speed were increased 10 times to 300 r.p.m., the shear rate would increase to 5,000 reciprocal seconds and the thrust, which increases linearly with shear rate, would increase to 640 lbs. It is thus apparent that the liquid is capable of a normal force of substantial value.

In the environment of FIG. 1, a normal force of 640 lbs. could correspond to a maximum pressure of about 480 p.s.i., which means that the viscoelastic liquid could flow along the shaft at a pressure of this magnitude, i.e. 480 p.s.i.

Besides the liquid described, a number of viscoelastic liquids which exhibit the normal force phenomenon are available and may be chosen from both aqueous and nonaqueous systems. They include solutions of high polymers in nonaqueous solvents, high polymers in liquid form, and solutions of certain soaps dissolved in hydrocarbon solvents. More particularly, the liquids include polyisobutylene in meneral oil, poly (alkyl metacrylates) in mineral oil or in dimethylphthalate, polyisobutylene in Decalin or in o-dichlorobenzene, rubber in xylene or in benzene, polystyrene in Decalin or in dimethylphthalate, methylcellulose or sodium carboxymethylcellulose in water, aluminium or calcium soaps of fatty or naphthenic acids dissolved in hydrocarbons, calcium acetate dispersions, glue in water, etc.

Desirably these liquids should have an apparent viscosity in the range of about 1 to 1000 poises or more at a shear rate in the range of about 10,000 to 1 reciprocal seconds. They may exhibit a normal force of up to several hundred pounds of thrust, or from a few tenths, to several hundred p.s.i. These are illustrative values.

The term "liquid" means all fluids other than gases.

The temperature of the viscoelastic liquid, during use, is desirably controlled to maintain the normal force at a substantial level of magnitude. Generally, viscoelastic liquids will be effective at temperatures in the range of 50 to 100° F., although it is to be understood that liquids can be selected to operate in different ranges, for example, —50° to 0° F., 75° to 175° F., 200° to 300° F., etc. Conventional means of temperature control are suitable, comprising the use of internal ducts in the housing and/or bearing for circulation therethrough of a cooling fluid, or the provision of fans suitably operated by the shaft, and the like.

If desired, a small pump may be used to return liquid from the end face 13 and/or reservoir 20 to the reservoir 18, although it is apparent that the use of gravity flow has obvious advantages.

The flow of lubricating liquid may be from one end of the shaft to the other, or it may be from a central portion of the shaft to each end. In the latter arrangement, the plate 14 of FIG. 1 is to be considered as disposed between a housing 11, as shown, and another like housing, not shown, disposed on the left hand side of the plate as seen in FIG. 1.

The invention is applicable to antifriction bearings, such as roller and ball bearings, as well as journal bearings.

The terms "outer" or "outwardly," as used in connection with points disposed radially of the plates, refer to points disposed toward the periphery of the plates, while "inner" or "inwardly" refers to points disposed toward the axis of rotation of the plates. When used to refer to points located axially of the shaft, "outer" or "outwardly" refers to points disposed away from the transverse center or midpoint of the shaft, while "inner" or "inwardly" refer to points disposed toward such transverse center.

It will be understood that the invention is capable of obvious variations without departing from its scope.

In the light of the foregoing description, the following is claimed.

1. In a device comprising a lubricated rotatable member supported by a housing which is stationary relatively to the member and wherein lubricating liquid is present in the housing and in contact with the member, an improved lubricant pumping system comprising a substantially flat plate fixed to the member and slightly spaced from an end of the housing to form therebetween a narrow gap, said end of the housing adjacent said plate having a substantially flat surface, said plate and surface being substantially parallel and defining therebetween said narrow gap, said plate being rotatable with the member while said surface is stationary, said liquid being present in the gap and comprising a viscoelastic liquid, rotation of the member and fixed plate acting to apply stress to the liquid and to subject the same to rotary shear, said liquid in shear generating a normal force effect by means of which the liquid flows along the surfaces of the member toward an end thereof opposite the disposition of said plate, means for collecting said liquid adjacent said end, and means for returning the liquid to said gap.

2. The device of claim 1 wherein a reservoir of liquid is provided adjacent said plate end in which the plate is partly immersed.

3. The device of claim 2 wherein said liquid returning means comprises a second reservoir disposed above said first reservoir so that said liquid is returned by gravity.

4. The device of claim 3 wherein means are provided adjacent the periphery of said gap for initially introducing liquid thereto.

5. In a device comprising a lubricated rotatable shaft supported in a housing which is stationary relatively to the shaft, said shift having end portions which are supported by bearings in said housing and which extend beyond said bearings, and wherein lubricating liquid is present in the housing in contact with the shaft and bearings, an improved lubricant pumping system for flowing said liquid continuously along the shaft comprising a plate fixed to an end portion of the shaft outwardly of a bearing and slightly spaced away from and end wall of the housing, said plate and end wall having adjacent surfaces that are substantially flat and substantially parallel to each other and which define a narrow gap therebetween, said plate being rotatable with the shaft while said end wall is stationary with the housing, said liquid being present in said gap and comprising a viscoelastic liquid, rotation of the shaft and plate acting to apply stress to the liquid in the gap and to subject the same to rotary shear, said liquid in shear generating a normal force in a direction extending along said shaft toward an end wall opposite said first end wall, whereby the normal force effect acts to move said liquid along the shaft to and through said second end wall, means at the second end wall for collecting said liquid, and means for returning the collected liquid to said gap.

References Cited

UNITED STATES PATENTS

| | | |
|---|---|---|
| 1,914,498 | 6/1933 | Gardner. |
| 2,068,377 | 1/1937 | Crittenden. |
| 3,046,603 | 7/1962 | Maxwell _____ 103—95 X |
| 3,223,196 | 12/1965 | Stott _____ 103—95 X |

OTHER REFERENCES

Maxwell, B. and Scalora, A. J.: The Elastic Melt Extruder Works Without Screw, In Modern Plastics, 37(2), pp. 107–109, 112, 114, 202, 204, 208, 210, October 1959.

Henry, J. E. and Plymale, C.E.: Applications of the Elastic Melt Extruder, In SPE Journal, 21(4), pp. 391–395, April 1965.

LAVERNE D. GEIGER, *Primary Examiner.*

EDWARD J. EARLS, *Assistant Examiner.*

U.S. Cl. X.R.

103—95; 184—26; 308—78

UNITED STATES PATENT OFFICE
CERTIFICATE OF CORRECTION

Patent No. 3,443,663                                                   May 13, 1969

David B. Cox

It is certified that error appears in the above identified patent and that said Letters Patent are hereby corrected as shown below:

Column 1, line 18, "connected" should read -- collected --; line 66, "face" should read -- fact --. Column 2, line 38, "mens" should read -- means --; line 52, "surfacs" should read -- surfaces --. Column 3, line 28, "by" should read -- of --; line 46, "plates" should read -- plate --; line 72, "metacrylates" should read -- methacrylates --.

Signed and sealed this 31st day of March 1970.

(SEAL)
Attest:

Edward M. Fletcher, Jr.                              WILLIAM E. SCHUYLER, JR.
Attesting Officer                                              Commissioner of Patents